(12) United States Patent
Agarwal et al.

(10) Patent No.: US 9,112,794 B2
(45) Date of Patent: Aug. 18, 2015

(54) DYNAMIC MULTIPATH FORWARDING IN SOFTWARE DEFINED DATA CENTER NETWORKS

(71) Applicant: International Business Machines Corporation, Armonk, NY (US)

(72) Inventors: Kanak B. Agarwal, Austin, TX (US); John B. Carter, Austin, TX (US); Colin K. Dixon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 14/072,018

(22) Filed: Nov. 5, 2013

(65) Prior Publication Data
US 2015/0124812 A1    May 7, 2015

(51) Int. Cl.
*H04L 12/28* (2006.01)
*H04L 12/56* (2006.01)
(Continued)

(52) U.S. Cl.
CPC .............. *H04L 45/24* (2013.01); *H04L 45/586* (2013.01)

(58) Field of Classification Search
CPC ....... H04L 12/18; H04L 12/66; H04L 12/462; H04L 12/465; H04L 12/2613; H04L 12/4625; H04L 12/4633; H04L 12/4641; H04L 12/4645; H04L 12/4675; H04L 12/5689; H04L 12/5696; H04L 29/06197; H04L 29/12009; H04L 29/12047; H04L 29/12207; H04L 29/12283; H04L 29/12301; H04L 29/12839; H04L 41/00; H04L 41/042; H04L 41/0893; H04L 43/028; H04L 45/00; H04L 45/16; H04L 45/24; H04L 45/38; H04L 45/42; H04L 45/44; H04L 45/50; H04L 45/66; H04L 45/72; H04L 45/74; H04L 45/245; H04L 45/586; H04L 45/745; H04L 45/7453; H04L 47/10; H04L 47/20; H04L 47/125; H04L 47/193; H04L 47/726; H04L 47/825; H04L 47/2441; H04L 47/2483; H04L 49/35; H04L 49/70; H04L 49/253; H04L 49/254; H04L 49/351; H04L 49/354; H04L 49/356; H04L 49/1546; H04L 49/3063; H04L 61/15; H04L 61/2015; H04L 61/2061; H04L 61/6022; H04L 67/104; H04L 69/324; H04L 2212/0025; G06F 9/45533; G06F 15/17312; G06F 2009/45595; G06F 2009/4557; H04M 7/0075
USPC .................. 370/235–240, 328–399, 400–422
See application file for complete search history.

(56) References Cited

U.S. PATENT DOCUMENTS 6,151,324 A * 11/2000 Belser et al. .................. 370/397
6,292,838 B1    9/2001 Nelson
(Continued)

FOREIGN PATENT DOCUMENTS

CN    1705307 A    12/2005
CN   102318290 A    1/2012
(Continued)

OTHER PUBLICATIONS

U.S. Appl. No. 14/036,894.
(Continued)

*Primary Examiner* — Tri H Phan
(74) *Attorney, Agent, or Firm* — Stephen R. Tuace; Stephen J. Walder, Jr.; William J. Stock

(57) ABSTRACT

A mechanism is provided in a logically centralized controller for dynamic multipath forwarding in a software defined network. The mechanism identifies a set of multiple forwarding paths for a flow. The mechanism assigns a virtual destination address for each multiple forwarding path in the set of multiple forwarding paths. The mechanism installs virtual destination address based forwarding rules in switches for each multiple forwarding path and installs rewriting rules in an egress switch for all paths in the set of multiple forwarding paths. Each rewriting rule rewrites one of the virtual destination address to the real destination address. The mechanism configures an ingress switch to dynamically select a path from the set of multiple forwarding paths based on a multipath policy and rewrite the destination address from the real destination address to a virtual destination address corresponding to the selected path.

20 Claims, 5 Drawing Sheets

(51) Int. Cl.
*H04L 12/707* (2013.01)
*H04L 12/713* (2013.01)

(56) References Cited

U.S. PATENT DOCUMENTS

| | | | |
|---|---|---|---|
| 6,553,028 B1 * | 4/2003 | Tang et al. | 370/389 |
| 6,711,171 B1 | 3/2004 | Dobbins et al. | |
| 7,075,910 B2 | 7/2006 | Chen et al. | |
| 7,822,027 B2 * | 10/2010 | Yadav et al. | 370/389 |
| 8,072,984 B2 | 12/2011 | Chang | |
| 8,432,807 B2 | 4/2013 | Kohn et al. | |
| 8,867,349 B2 * | 10/2014 | Martini et al. | 370/230.1 |
| 8,996,683 B2 * | 3/2015 | Maltz et al. | 709/224 |
| 2008/0205377 A1 | 8/2008 | Chao et al. | |
| 2011/0299413 A1 | 12/2011 | Chatwani et al. | |
| 2012/0163174 A1 | 6/2012 | Shukla et al. | |
| 2012/0198091 A1 | 8/2012 | Kanada et al. | |
| 2013/0058341 A1 | 3/2013 | Fulton et al. | |
| 2013/0070762 A1 | 3/2013 | Adams et al. | |
| 2013/0086236 A1 | 4/2013 | Baucke et al. | |
| 2013/0152075 A1 | 6/2013 | Cardona et al. | |
| 2013/0208623 A1 | 8/2013 | Koponen et al. | |
| 2014/0013324 A1 * | 1/2014 | Zhang et al. | 718/1 |
| 2014/0023074 A1 * | 1/2014 | Mishra et al. | 370/390 |

FOREIGN PATENT DOCUMENTS

| | | |
|---|---|---|
| CN | 102857416 A | 1/2013 |
| CN | 103051629 A | 4/2013 |
| WO | WO2007/009352 A1 | 1/2007 |
| WO | WO2011/051182 A1 | 5/2011 |
| WO | WO2013/114489 A1 | 8/2013 |

OTHER PUBLICATIONS

Drutskoy, Dmitry A., "Software-Defined Network Virtualization with FlowN", Master's Thesis, Princeton University, Jun. 2012, 28 pages.

Ghorbani, Soudeh et al., "Walk the Line: Consistent Network Updates with Bandwidth Guarantees", HotSDN '12, Aug. 13, 2012, ACM 2012, 6 pages.

Hu, Yan et al., "GARDEN: Generic Addressing and Routing for Data Center Networks", 2012 IEEE Fifth International Conference on Cloud Computing, IEEE, 2012, 8 pages.

Jiao, Liang et al., "MRS: A Click-based Multipath Routing Simulator", 2012 7th International ICST Conference on Communications and Networking in China, IEEE, 2012, 10 pages.

Moon, Daekyeong, "Achieving Flexibility and Performance for Packet Forwarding and Data Center Management", Dissertation, University of California, Berkeley, Technical Report No. UCB/EECS-2010-68, May 12, 2010, http://www.eecs.berkeley.edu/Pubs/TechRpts/2010/EECS-2010-66.html, 84 pages.

Mysore, Radhika N. et al., "Portland: A Scalable Fault-Tolerant Layer 2 Data Center Network Fabric", SigComm 2009, Aug. 17-21, 2009, ACM 2009, 12 pages.

Reitblatt, Mark et al., "Abstractions for Network Update", SigComm 2012, Aug. 13-17, ACM 2012, 12 pages.

Reitblatt, Mark et al., "Consistent Updates for Software-Defined Networks: Change You Can Believe In!" Hotnets '11, Nov. 14-15, 2011, ACM 2011, 6 pages.

Rosen, E et al., "Multiprotocol Label Switching Architecture", Jan. 2001, http://tools.ietf.org/pdf/rfc3031.pdf, 62 pages.

Stephens, Brent, "Designing Scalable Networks for Future Large Datacenters", Thesis, Rice University, May 2012, 95 pages.

International Search Report and Written Opinion dated Dec. 31, 2014 for International Application No. PCT/CN2014/087324, 12 pages.

* cited by examiner

DYNAMIC MULTIPATH FORWARDING IN SOFTWARE DEFINED DATA CENTER NETWORKS

BACKGROUND

The present application relates generally to an improved data processing apparatus and method and more specifically to mechanisms for dynamic multipath forwarding in software defined data center networks.

Software Defined Networking (SDN) is an approach to computer networking that allows network administrators to manage network services through abstraction of lower level functionality. This is done by decoupling the system that makes decisions about where traffic is sent (the control plane) from the underlying systems that forwards traffic to the selected destination (the data plane). With SDN, network intelligence and state are logically centralized and the underlying network infrastructure is abstracted from the applications.

SDN requires some mechanism for the control plane to communicate with the data plane. One such mechanism, OpenFlow, is a standard interface designed specifically for SDN that structures communication between the control and data planes of supported network devices. OpenFlow allows direct access to, and manipulation of, the forwarding plane of network devices, such as switches and routers—both physical and virtual (hypervisor based). The OpenFlow protocol defines basic primitives that can be used by an external software application to program the forwarding plane of network devices, similar to the instruction set of a processor.

OpenFlow uses the concept of flows to identify network traffic based on pre-defined match rules that can be statically or dynamically programmed by the SDN control software. Since OpenFlow allows the network to be programmed on a very fine-grained match basis, an OpenFlow-based SDN architecture provides extreme granular control, enabling the network to respond to real-time changes at the application, user, and session levels.

SUMMARY

In one illustrative embodiment, a method, in a data processing system, is provided for dynamic multipath forwarding in a software defined network. The method comprises identifying a set of multiple forwarding paths for a flow. Each packet of the flow is issued by a source endpoint and has a real destination address corresponding to a destination endpoint. The method further comprises assigning a virtual destination address for each multiple forwarding path in the set of multiple forwarding paths. The method further comprises installing virtual destination address based forwarding rules in switches for each multiple forwarding path and installing rewriting rules in an egress switch for all paths in the set of multiple forwarding paths. Each rewriting rule rewrites one of the virtual destination address to the real destination address. The method further comprises configuring an ingress switch to dynamically select a path from the set of multiple forwarding paths based on a path selection policy and rewrite the destination address from the real destination address to a virtual destination address corresponding to the selected path.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
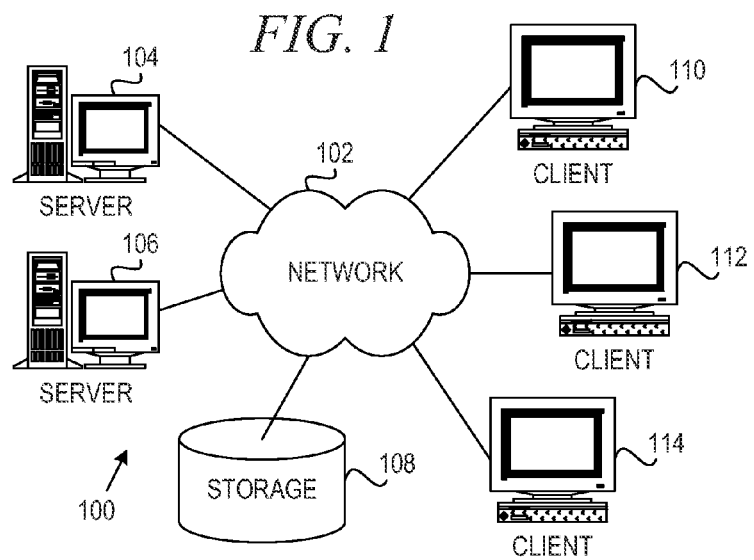
FIG. 1 depicts a pictorial representation of an example distributed data processing system in which aspects of the illustrative embodiments may be implemented.

The illustrative embodiments provide a mechanism for dynamic multipath forwarding in software defined data center networks. Ethernet packet forwarding requires switches in the network to have matching rules to specify what direction to send an incoming packet. Software Defined Networking (SDN) introduces the notion of these rules being computed and installed from a logically centralized controller. If each flow is allowed only one path, this causes inefficiency.

Multipathing sets up multiple forwarding paths between source and destination and allows for a given packet to pick from the set of available multiple paths. This introduces the problem of determining how to efficiently use these multiple paths for forwarding packets between source-destination pairs. Using per-packet multipathing, each packet in a given flow can potentially be sent on a different path independently. Per-packet multipathing is generally more expensive and harder to implement in connection-oriented networks due to packet reordering overhead that can occur at the destination due to differences in the path latencies. On the other hand, when using per-flow multipathing, each flow can potentially be sent on a different path, but all packets from a given flow remain on a single path to preserve packet ordering in the flow. Per-flow multipathing is usually a preferred multipathing scheme, particularly for data-center networks, because 99.9% of traffic inside a data center uses Transport Control Protocol (TCP), a connection-oriented protocol.

Current data packet (or simply "packet") forwarding requires switches in a data network to have matching rules to specify what direction to send an incoming packet, e.g., determining at each switch which port of the switch to transmit the packet through. Software Defined Networking (SDN) architectures allow these matching rules to be computed and installed from a logically centralized controller. Under OpenFlow protocol, the matching rules are based on 12-tuples (OpenFlow allows matching rules to be installed based on 12 header fields). Matching of fields in OpenFlow can be either an explicit match or a wildcard match. A wildcard match means the switch does not care what the value is in the specified field. An explicit match is a binary match, i.e., it matches or it does not. Even though OpenFlow protocol supports installing rules with very fine-grained matching of the packet header fields, the overall flexibility is limited by the available storage in switches, where the fine-grained forwarding state can be stored. The fine-grained forwarding rules are typically installed in the switch Ternary Content Addressable Memory (TCAM).

In the current switches, TCAMs are a precious resource with very limited storage capability (e.g., a switch may only provide support for 750-1K matching rules) because TCAM requires 6-7× as much chip area as SRAM to hold the same information. TCAMs in the current switch hardware are limited because they are designed to implement policy rules such as access controls and Quality of Service (QoS) rather than base forwarding. An OpenFlow enabled hardware allows the flexibility to use the TCAM to implement any fine-grained rule. However, due to TCAM size limitations, practical implementations are forced to use more coarse-grained matching rules and rule aggregation techniques, thus failing to provide the fine grained dynamic networking control purported by SDN.

On the other hand, matching rules that match only on the destination address, e.g., Destination Media Access Control (DMAC) address can be stored in a less expensive and higher capacity memory device, such as a static random access memory (SRAM), binary content addressable memory (CAM), or the like. The current switch hardware contains very large tables that allow matching and forwarding based on the DMAC header field. Thus, while destination address based matching rules are also coarse-grain rules, many more of these types of rules may be stored in the less expensive and higher capacity memory devices.

Current solutions to the problem of using multiple paths for forwarding packets include equal cost multipathing (ECMP) and transparent interconnect of lots of links (TRILL). In the network layer stack, the first layer, L1, is the physical layer, L2 is the link (e.g., Ethernet) layer, and is the network (e.g., IP) layer. ECMP is generally implemented at L3 layer, where L2 switches are connected with routers using Internet Protocol (IP) addresses. ECMP routing scheme allows next hop routing to occur at multiple equal cost paths. TRILL, on the other hand, is a L2 layer multipath solution but requires special hardware switch support. Furthermore, the current multipath solutions make forwarding decisions on a per-hop basis, which is not efficient end-to-end.

The illustrative embodiments provide an end-to-end multipathing mechanism at L2 with current hardware. The mechanism enables efficient implementation of multipath forwarding in software-defined networks with per-flow multipathing. The mechanism finds a set of multiple forwarding paths for a source-destination pair and assigns a virtual destination Media Access Control (MAC) address, referred to herein as a vMAC, for each path. The mechanism then installs virtual destination based forwarding rules in the switches for each path. The mechanism also installs vMAC to real MAC re-writing rules for all paths in the egress switch. The mechanism then configures the ingress switch to dynamically select and re-write the destination MAC address for each packet in the flow to one of the vMAC addresses based on a multipath policy.

Figure 2:
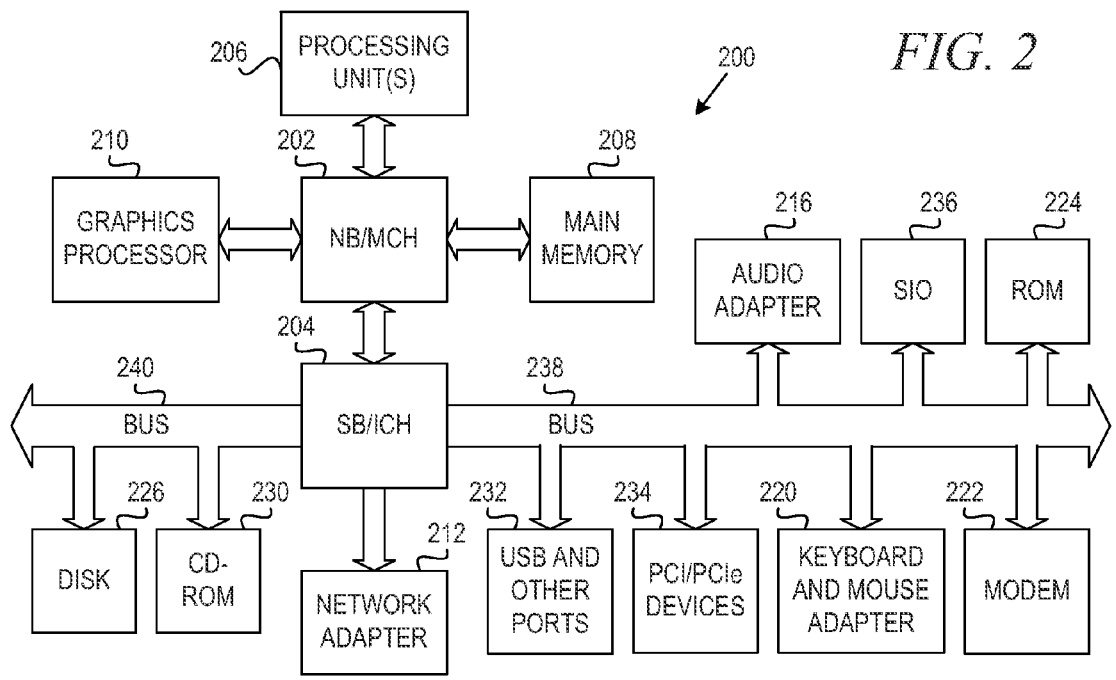
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of art example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 12 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while Pele does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive) (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the network 102 is comprised of a plurality of network routing and forwarding devices, e.g., switches, routers, and the like. One or more of the computing devices coupled to the network 102, e.g., server 104 or 106, may implement a network controller, such as a Software Defined Network (SDN) controller that, in accordance with the illustrative embodiments, provides mechanisms for multipath forwarding using multiple virtual MAC addresses for a destination. The controller maintains a mapping of a data flow to a set of forwarding paths, each path having a corresponding vMAC address. When a source computing device, such as a client computing device 110, for example, wishes to communicate with a destination computing device, e.g., server 104 or client computing device 112, a data flow is established between the source and destination devices. In establishing this data flow, the SDN controller, or the like, may install virtual destination based forwarding rules in the switches of network 102 for each path. The SDN controller also installs vMAC to real MAC re-writing rules for all paths in the egress switch and configures the ingress switch to dynamically select a path from the set and re-write the destination MAC address to the corresponding vMAC address. Thus, for each packet in the flow, the ingress switch re-writes the destination MAC address to the appropriate vMAC address, and the switches are already configured with the rules to properly forward the packet.

Figure 3:
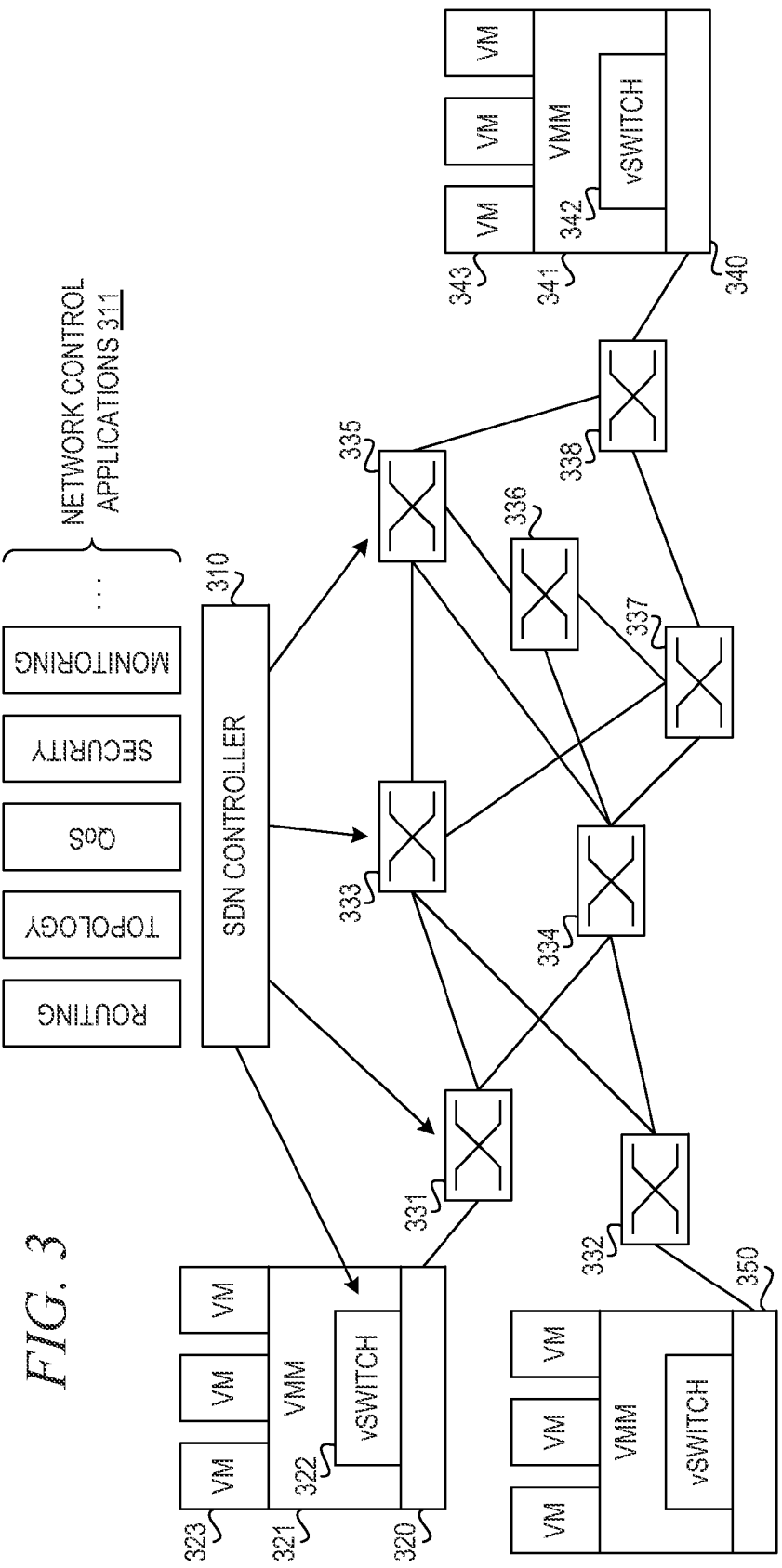
FIG. 3 is a block diagram of an example software defined network in which aspects of the illustrative embodiments may be implemented.

FIG. 3 is a block diagram of an example software defined network in which aspects of the illustrative embodiments may be implemented. In the software defined network, endpoint devices 320, 340, 350 communicate via switches 331-338. Endpoint computing device 320 may comprise a virtual machine monitor (VMM) 321, also referred to as a hypervisor, and one or more virtual machines 323. VMM 321 comprises a virtual switch (vSwitch) 322. Similarly, endpoint computing device 340 may comprise VMM 341 and one or more 343, and VMM 341 may comprise vSwitch 342.

In Software Defined Networking (SDN), a centralized controller 310 computes and installs rules for Ethernet packet forwarding to switches 331-338, including virtual switches (vSwitches) 322, 342. SDN controller 310 runs network control applications 311, which may include routing, topology, quality of service (QoS), security, monitoring, etc. Switches 331-338 and vSwitches 322, 342 comprise programmable forwarding tables to store rules from SDN controller 310. Using these rules, the switches forward packets from source endpoint computing device 320 to a destination endpoint computing device 340, for example.

Allowing only one path for all flows causes inefficiency. Multipathing allows for a given flow to choose from multiple paths. The illustrative embodiments provide a mechanism that enables efficient implementation of multipath forwarding in software defined networks with per-flow multipathing.

Figure 4:
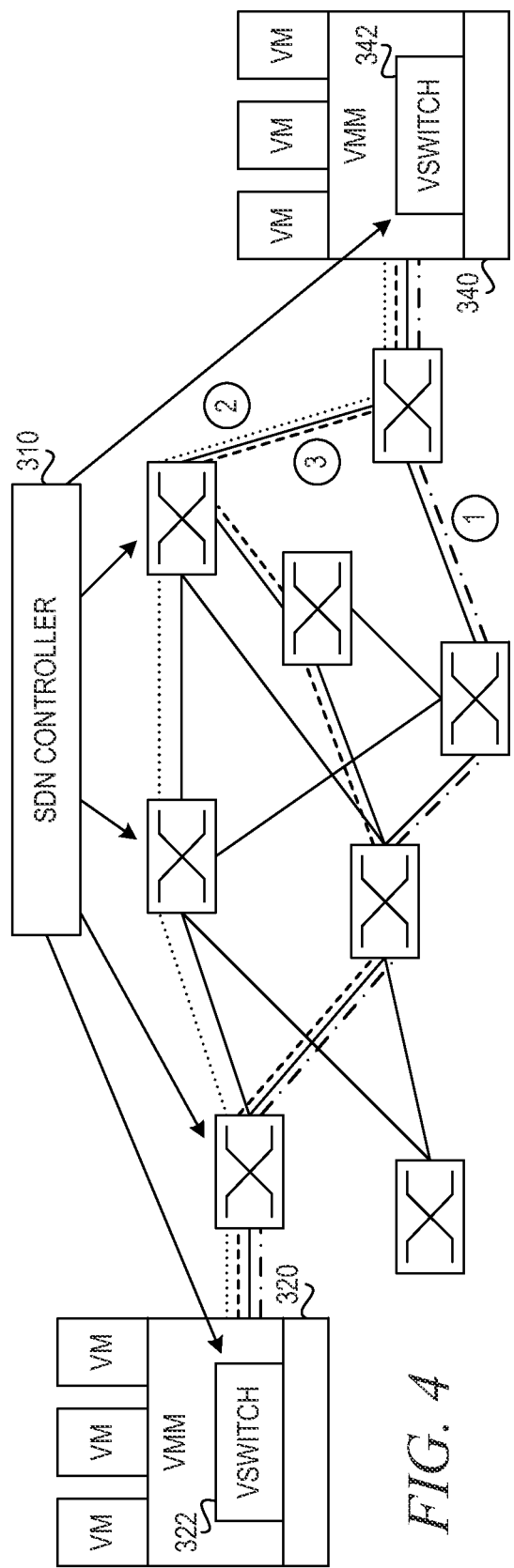
FIG. 4 illustrates multiple end-to-end paths between a source and a destination in accordance with an illustrative embodiment.

FIG. 4 illustrates multiple end-to-end paths between a source and a destination in accordance with an illustrative embodiment. In the example depicted in FIG. 4, source endpoint computing device 320 may communicate with destination endpoint computing device 340 via a set of three paths. A generic multipath set may consist of multiple shortest paths of different lengths, disjoint paths or paths with shared hops, etc. Data center network topologies provide significant flexibility in selecting multipath sets for source-destination pairs.

In accordance with an illustrative embodiment, logically centralized controller 310 assigns a unique virtual MAC (vMAC) address to each path in the multipath set for a source-destination pair. Logically centralized controller 310 uses the assigned vMAC addresses to install destination based forwarding rules for each path in the switches. The destination host 340 is configured to accept packets destined to the vMAC addresses. This can be done by configuring the destination 340 network interface card (NIC) in promiscuous mode. Alternatively, SDN controller 310 may configure the egress switch, vSwitch 342 or physical edge switch 338, to rewrite destination MAC address from the vMAC addresses to the real MAC address.

Figure 5:
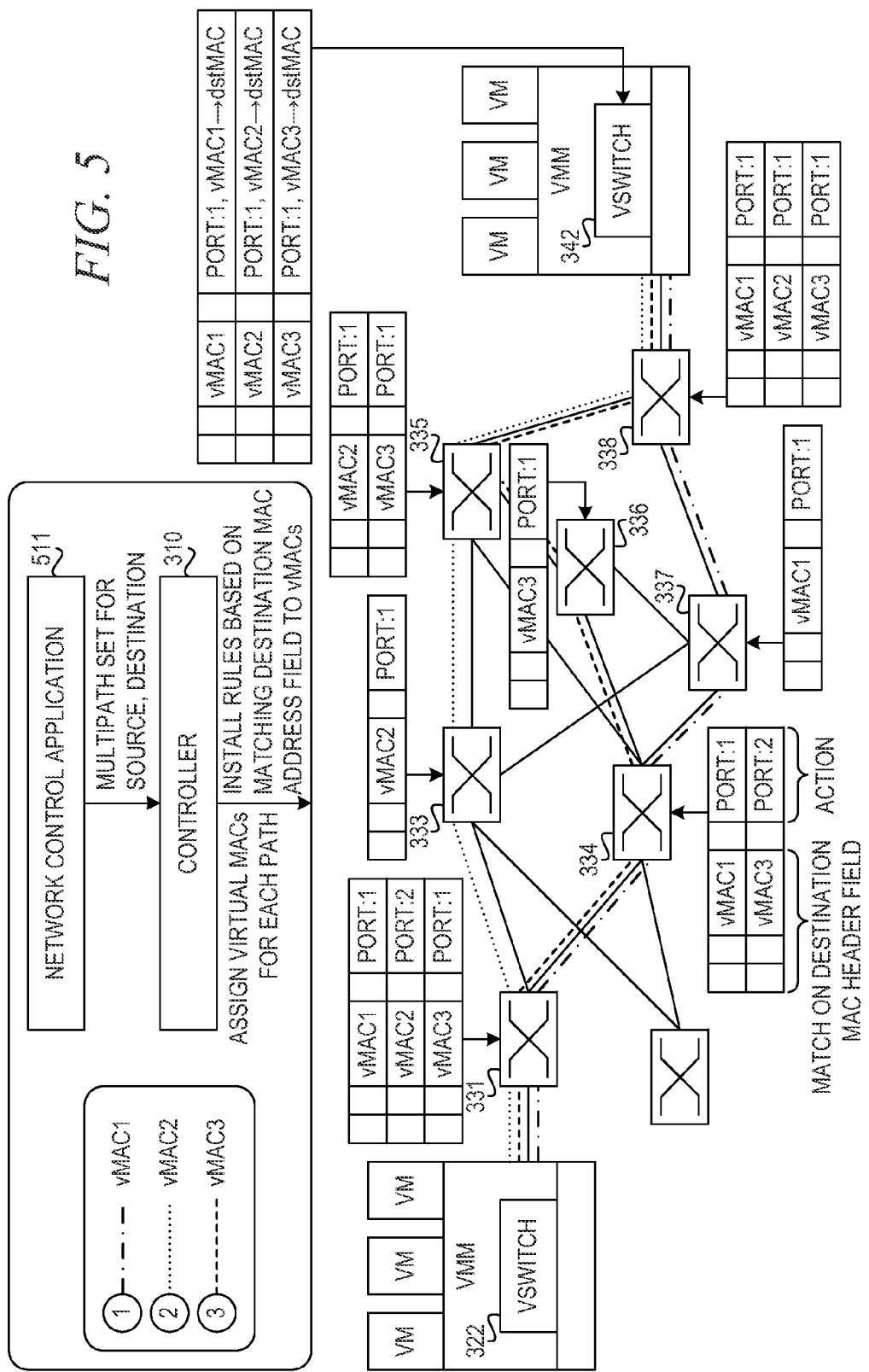
FIG. 5 illustrates multipath rule installation in accordance with an illustrative embodiment.

FIG. 5 illustrates multipath rule installation in accordance with an illustrative embodiment. Network control application 511 creates a multipath set for a source-destination pair and provides the path set to controller 310, which assigns a vMAC address to each path in the set (vMAC1, vMAC2, vMAC3). Controller 310 then installs rules based on matching the destination MAC address field to vMAC addresses.

Switches 331-338 have tables for rules that match on destination MAC address in the header field and provide an action. For example, all paths in the set go through switch 331, which has a table that matches each of the vMAC addresses and forwards each packet to the appropriate port. Thus, in switch 331, packets with vMAC1 or vMAC3 as the destination address are forwarded to port 1 and packets with vMAC2 as the destination address are forwarded to port 2. Using these tables, packets with vMAC1 as the destination address are forwarded from vSwitch 322 to switch 331, switch 334, switch 337, switch 338, and to vSwitch 342. Packets with vMAC2 as the destination address are forwarded from vSwitch 322 to switch 331, switch 333, switch 335, switch 338, and to vSwitch 342. Packets with vMAC3 as the destination address are forwarded from vSwitch 322 to switch 331, switch 334, switch 336, switch 335, switch 338, and to vSwitch 342.

Controller 310 installs rules in vSwitch 342 that rewrite each vMAC address in the set to the destination address. In an alternative embodiment, controller 310 may install the address rewriting rules in physical egress switch 338.

Controller 310 configures the switch to which the source is attached to provide per-flow multipathing by destination MAC address de-multiplexing. The ingress switch identifies a new flow by matching packet header fields (source address and port, destination address and port, protocol). The ingress switch control logic dynamically selects a routing path for the flow by assigning one of the vMAC addresses for the destination to the flow. The ingress switch control logic may use a random or round-robin scheme or a hash-based scheme based on applying a hash function to the flow specific packet header fields.

In accordance with an example embodiment, path selection configuration may be performed by the ingress switch. With configuration by a virtual ingress switch, such as vSwitch 322, the virtual switch may perform dynamic path selection locally. In this scenario, controller 310 pre-installs all the paths and configures vSwitch 322 with various options beforehand. On a new flow for which a rule does not exist in vSwitch 322, the packet is forwarded to the local control plane logic of the vSwitch 322. The control plane of the vSwitch 322 selects one of the paths and installs the corresponding rule based on the selected path in its data plane. Once a vSwitch data plane is configured to forward the packets from a flow along a path, the subsequent packets belonging to the flow are forwarded using the configured path.

With configuration by a physical ingress switch, such as switch 331, the switch uses OpenFlow protocol to communicate with the controller 310, which performs the path selection and installs the corresponding rule in the table of the switch 331. On a new flow for which a rule does not exist in the physical ingress switch 331, the switch forwards the packet to controller 310. Controller 310 gets a "packet_in" message from the ingress switch on new flows and installs a new rule in the switch 331 to do rewrite and forwarding after selecting an appropriate virtual MAC address for the flow.

Figure 6:
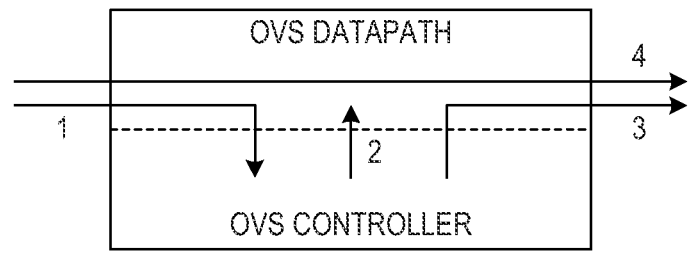
FIG. 6 illustrates an Open vSwitch in which aspects of an example embodiment may be implemented.

FIG. 6 illustrates an Open vSwitch in which aspects of an example embodiment may be implemented. In accordance with the example embodiment, path forwarding rules may be configured in an Open vSwitch (OVS). On receiving the first packet of a flow, the OVS controller programs the OVS datapath to use one of the vMAC address mappings for the flow. The OVS controller on the host is configured to maintain updated destination MAC to vMAC mappings based on the installed multipath sets. The first packet of a flow is sent to the OVS controller, which selects one of the paths and accordingly programs the datapath's actions for subsequent packets in the flow. The OVS controller returns the packet to the datapath. Subsequent packets from the flow are handled directly by the OVS datapath according to the flow rules configured by the OVS controller.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 7:
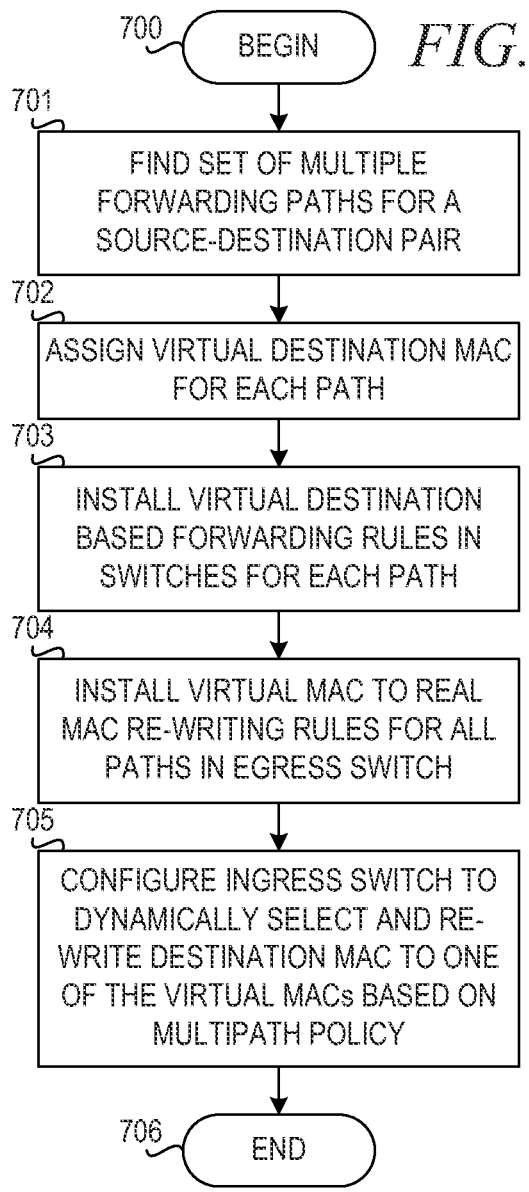
FIG. 7 is a flowchart illustrating operation of a mechanism for dynamic multipath forwarding in software defined data center networks in accordance with an illustrative embodiment.

FIG. 7 is a flowchart illustrating operation of a mechanism for dynamic multi path forwarding in software defined data center networks in accordance with an illustrative embodiment. Operation begins (block 700), and the mechanism finds a set of multiple forwarding paths for a source-destination pair (block 701). The mechanism assigns a unique virtual destination MAC address for each path (block 702). The mechanism then installs virtual destination address based forwarding rules in switches for each path (block 703). The mechanism also installs virtual MAC address to real MAC address rewriting rules for all paths in the egress switch (block 704). The mechanism configures the ingress switch to dynamically select a path and rewrite the destination MAC to the corresponding virtual MAC address based on a multipath policy (block 705). Thereafter, operation ends (block 706).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide dynamic multipath forwarding in software defined data center networks. The illustrative embodiments provide L2 multipathing on current, basic Ethernet hardware. The illustrative embodiments do not require new hardware/firmware as with TRILL and do not limit multipathing to L3 as with ECMP. The illustrative embodiments provide end-to-end multipathing with more understanding of path selections than when done per-hop, which leads to more efficient network utilization. The illustrative embodiments use only destination based forwarding in the fabric. Multipath rules can be installed into much larger L2 table instead of TCAMs. The illustrative embodiments also provide software control of path assignment to flows using either ingress physical switch, ingress vSwitch, or OpenFlow controller. The illustrative embodiments provide all the benefits of multipathing, including better link utilization, higher end-to-end bandwidth, faster failover, etc.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a logically centralized controller, for dynamic multipath forwarding in a software defined network, the method comprising:
    identifying a set of multiple forwarding paths for a flow, wherein each packet of the flow is issued by a source endpoint and has a real destination address corresponding to a destination endpoint;
    assigning a virtual destination address for each multiple forwarding path in the set of multiple forwarding paths;
    installing virtual destination address based forwarding rules in switches for each multiple forwarding path;
    installing rewriting rules in an egress switch for all paths in the set of multiple forwarding paths, wherein each rewriting rule rewrites one of the virtual destination address to the real destination address; and
    configuring an ingress switch to dynamically select a path from the set of multiple forwarding paths based on a multipath policy and rewrite the destination address from the real destination address to a virtual destination address corresponding to the selected path.

2. The method of claim 1, wherein the destination endpoint is configured to accept packets destined to a virtual destination address.

3. The method of claim 1, further comprising:
    configuring a virtual switch in a host source virtual machine manager to provide per-flow multipathing by destination address demultiplexing.

4. The method of claim 3, wherein the virtual switch identifies a new flow by matching packet header fields and forwards the packet to virtual switch control logic.

5. The method of claim 3, wherein the virtual switch control logic allocates a forwarding path to the flow by assigning one of the virtual destination addresses of the destination to the flow.

6. The method of claim 5, wherein the virtual switch control logic allocates the forwarding path using a random scheme, a round-robin scheme, or a hash-based scheme.

7. The method of claim 3, wherein control logic of the virtual switch configures a virtual switch datapath to map the destination address to the assigned virtual address for all packets in the flow.

8. The method of claim 1, wherein the real destination address is a Media Access Control (MAC) address and wherein each virtual destination address is a virtual MAC address.

9. The method of claim 1, wherein the egress switch is a virtual switch in a virtual machine manager in the destination endpoint.

10. The method of claim 1, wherein the ingress switch is a virtual switch in a virtual machine manager in the source endpoint.

11. A computer program product comprising a computer readable storage medium having a computer readable program stored therein, wherein the computer readable program, when executed on a computing device, causes the computing device to:
    identify a set of multiple forwarding paths for a flow, wherein each packet of the flow is issued by a source endpoint and has a real destination address corresponding to a destination endpoint;
    assign a virtual destination address for each multiple forwarding path in the set of multiple forwarding paths;
    install virtual destination address based forwarding rules in switches for each multiple forwarding path;
    install rewriting rules in an egress switch for all paths in the set of multiple forwarding paths, wherein each rewriting rule rewrites one of the virtual destination address to the real destination address; and
    configure an ingress switch to dynamically select a path from the set of multiple forwarding paths based on a multipath policy and rewrite the destination address from the real destination address to a virtual destination address corresponding to the selected path.

12. The computer program product of claim 11, wherein the computer readable program further causes the computing device to:
    configure a virtual switch in a source virtual machine manager in the source endpoint to provide per-flow multipathing by destination address demultiplexing.

13. The computer program product of claim 12, wherein the virtual switch identifies a new flow by matching packet header fields.

14. The computer program product of claim 12, wherein control logic of the virtual switch allocates a forwarding path to the flow by assigning one of the virtual destination addresses of the destination to the flow.

15. The computer program product of claim 12, wherein control logic of the virtual switch configures a virtual switch datapath to map the destination address to the assigned virtual address for all packets in the flow.

16. An apparatus comprising:
   a processor; and
   a memory coupled to the processor, wherein the memory comprises instructions which, when executed by the processor, cause the processor to:
   identify a set of multiple forwarding paths for a flow, wherein each packet of the flow is issued by a source endpoint and has a real destination address corresponding to a destination endpoint;
   assign a virtual destination address for each multiple forwarding path in the set of multiple forwarding paths;
   install virtual destination address based forwarding rules in switches for each multiple forwarding path;
   install rewriting rules in an egress switch for all paths in the set of multiple forwarding paths, wherein each rewriting rule rewrites one of the virtual destination address to the real destination address; and
   configure an ingress switch to dynamically select a path from the set of multiple forwarding paths based on a multipath policy and rewrite the destination address from the real destination address to a virtual destination address corresponding to the selected path.

17. The apparatus of claim 16, wherein the instructions further cause the processor to:
   configure a virtual switch in a source virtual machine manager in the source endpoint to provide per-flow multipathing by destination address demultiplexing.

18. The apparatus of claim 17, wherein the virtual switch identifies a new flow by matching packet header fields.

19. The apparatus of claim 17, wherein control logic of the virtual switch allocates a forwarding path to the flow by assigning one of the virtual destination addresses of the destination to the flow.

20. The apparatus of claim 17, wherein control logic of the virtual switch configures a virtual switch datapath to map the destination address to the assigned virtual address for all packets in the flow.

* * * * *